United States Patent
Costa et al.

[15] 3,680,760
[45] Aug. 1, 1972

[54] CONTROL SYSTEM FOR INERTIA WELDING MACHINES

[72] Inventors: Philip Joseph Costa, Chillicothe, Ill.; Caterpillar Tractor Co., Peoria, Ill.

[22] Filed: April 17, 1970

[21] Appl. No.: 29,486

[52] U.S. Cl. .................228/2, 29/156, 156/73, 318/227
[51] Int. Cl. ...........................B23k 27/00
[58] Field of Search ...........228/2; 29/470.3; 156/73; 310/166; 321/3, 5; 318/227

[56] References Cited

UNITED STATES PATENTS

| | | | |
|---|---|---|---|
| 3,542,274 | 11/1970 | Miller | 228/2 |
| 3,516,591 | 6/1970 | Gage | 228/2 |
| 3,337,108 | 8/1967 | Taylor | 228/2 |
| 3,162,068 | 12/1964 | Hardy | 228/2 |
| 2,600,523 | 6/1952 | Ellis | 310/166 X |
| 2,507,399 | 5/1950 | Christensen | 310/166 |

*Primary Examiner*—John F. Campbell
*Assistant Examiner*—R. J. Craig
*Attorney*—Fryer, Tjensvold, Felix, Phillips & Lempio

[57] ABSTRACT

A control system for an inertial friction welding machine starts and accelerates an alternating current, induction drive motor to a preselected speed, senses the drive motor speed, automatically shuts-off power to the drive motor when the preselected speed is reached and signals a hydraulic control system to initiate and to terminate the welding sequence. The control system includes a DC link voltage control circuit, a frequency summing control circuit, a speed transducer, a control for setting the slip frequency, a waveshaping and gate control unit and a silicon controlled rectifier inverter.

11 Claims, 5 Drawing Figures

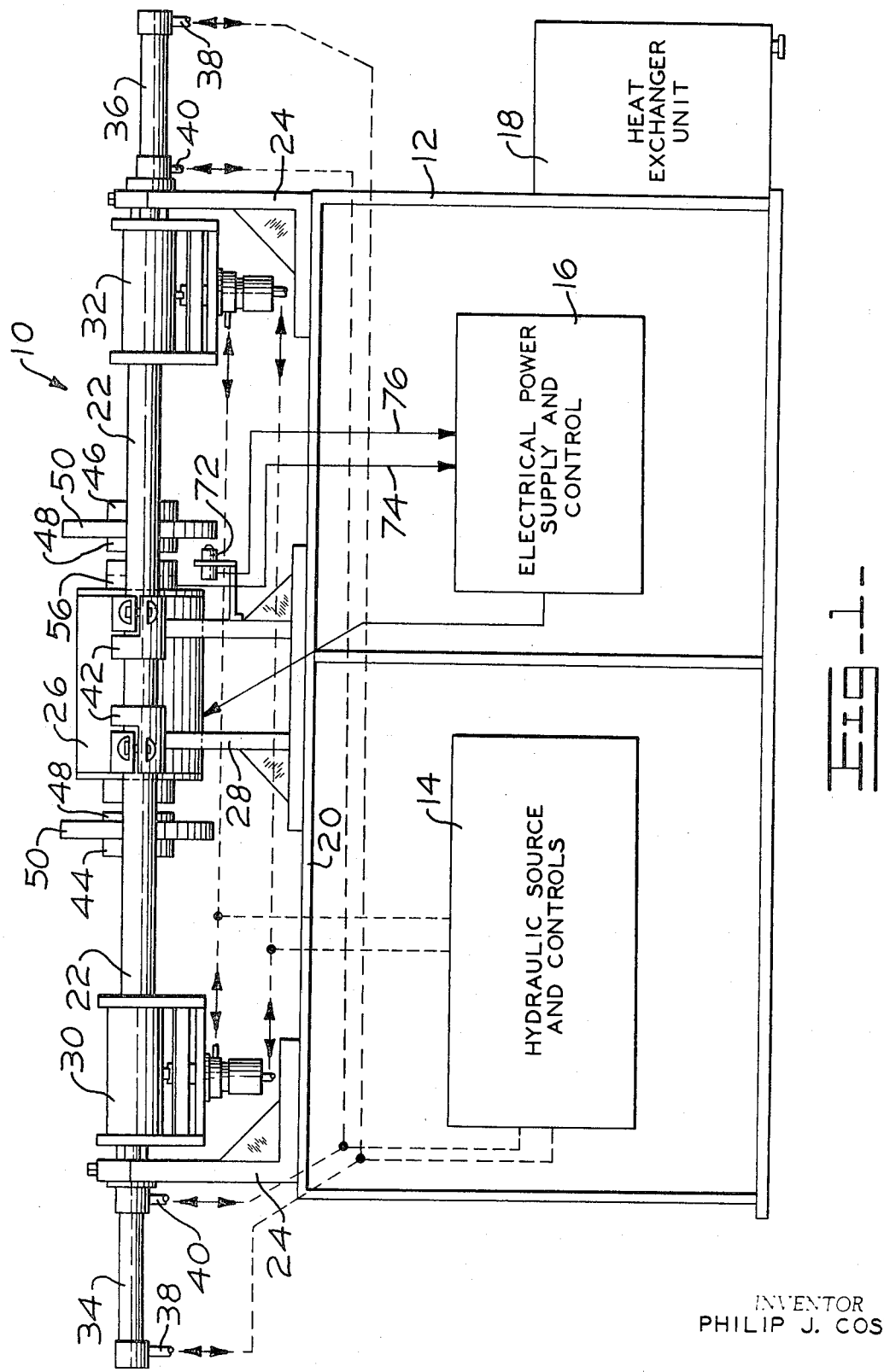

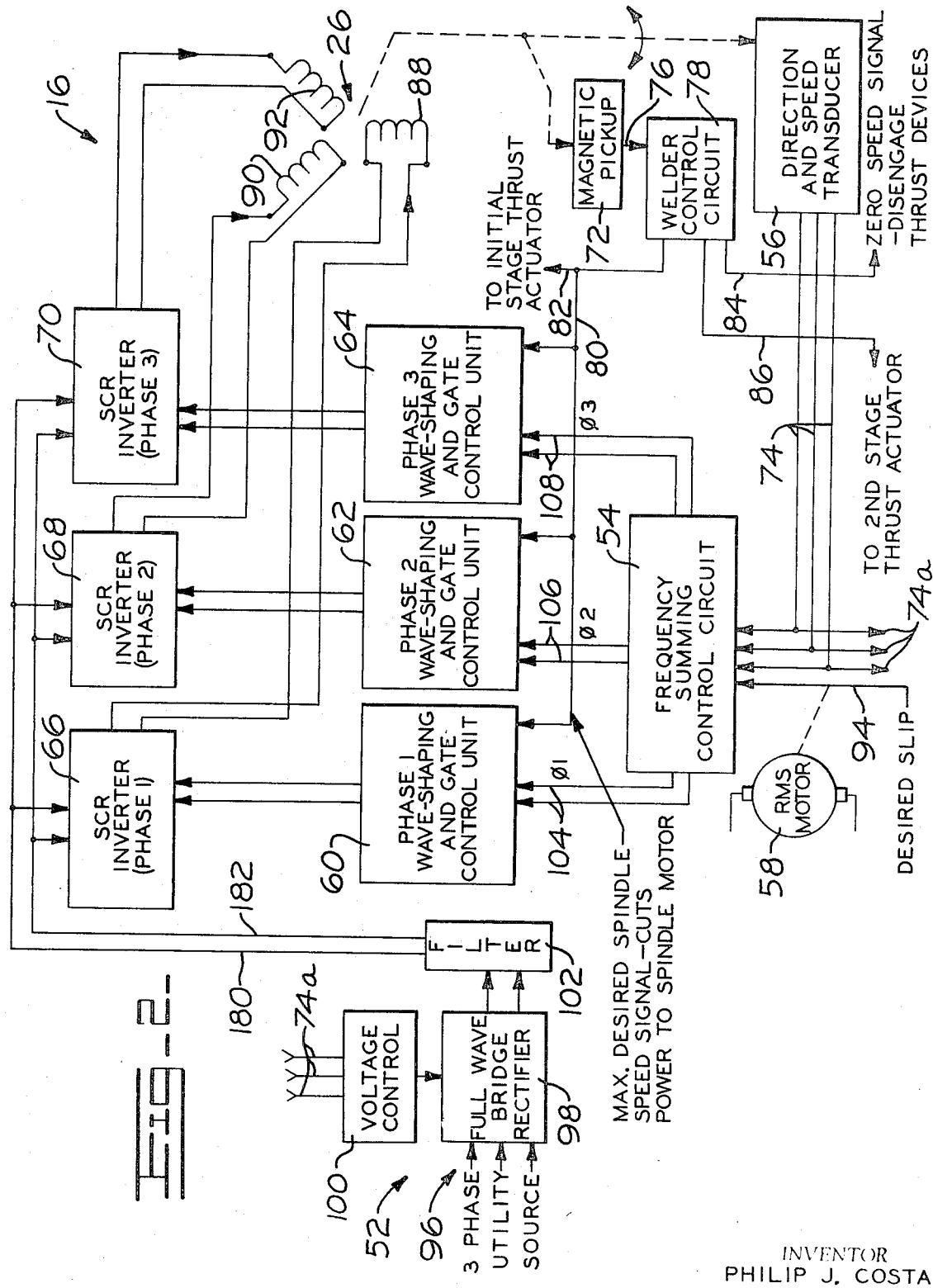

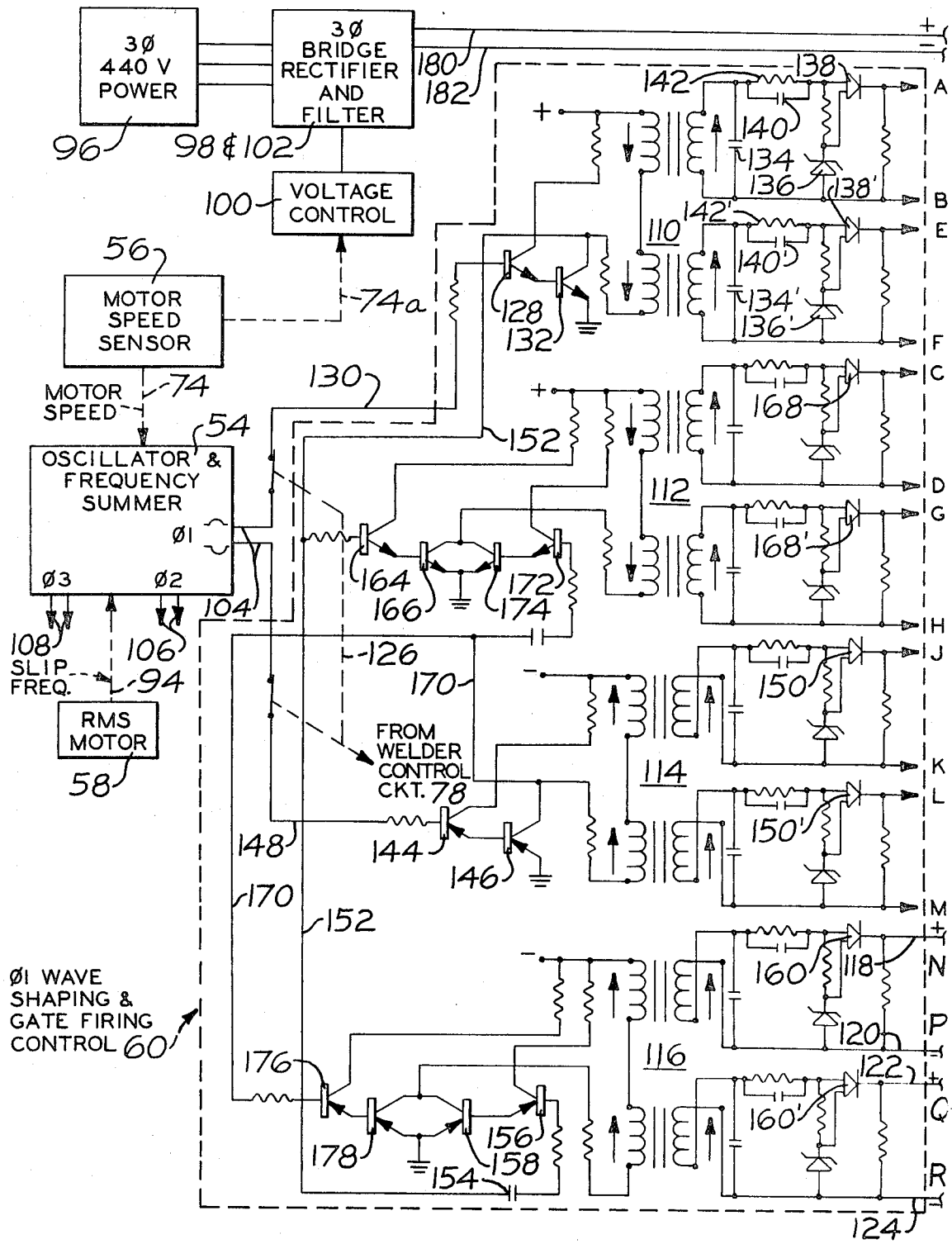
Fig-3-

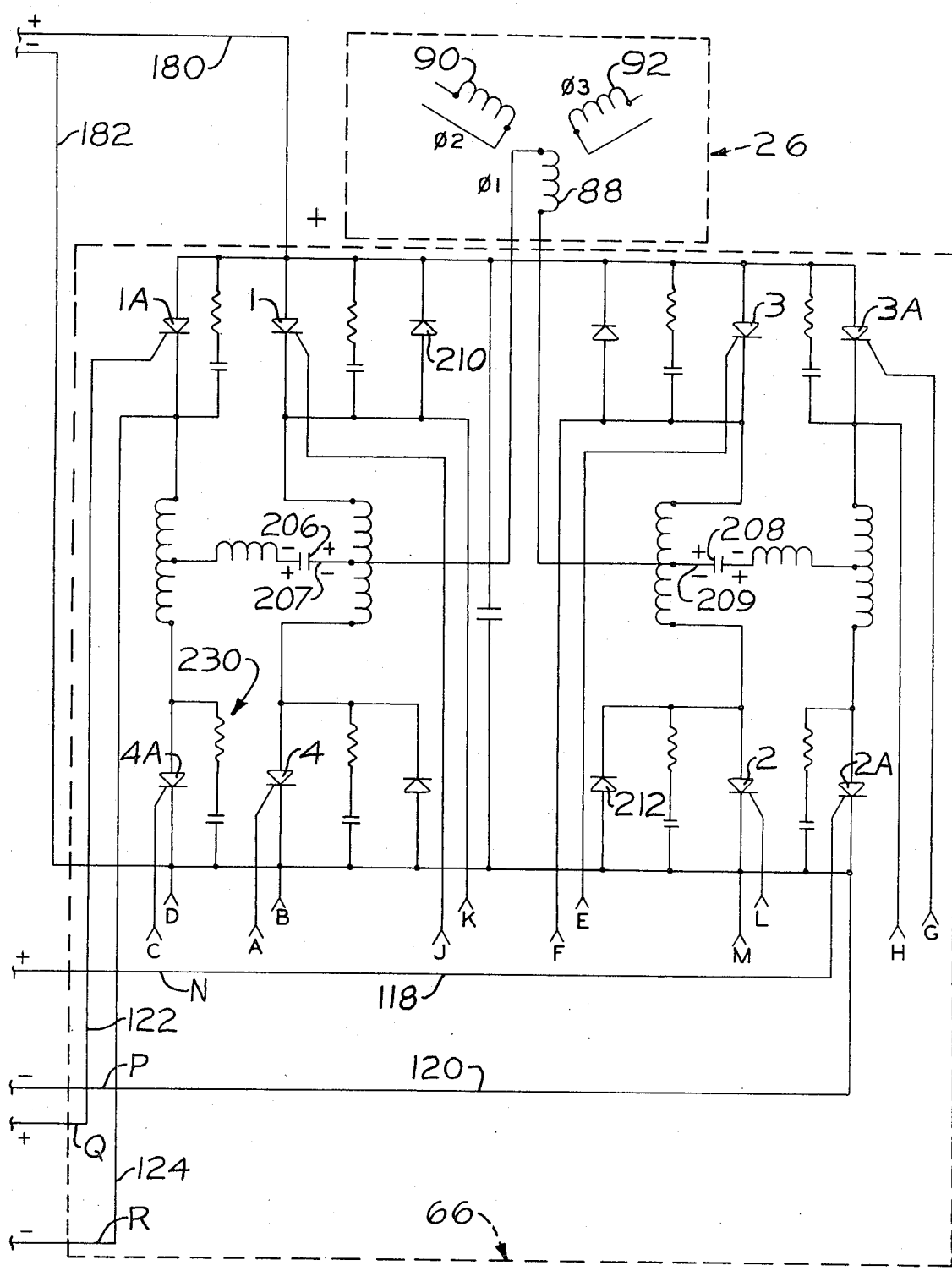
Fig_3A_

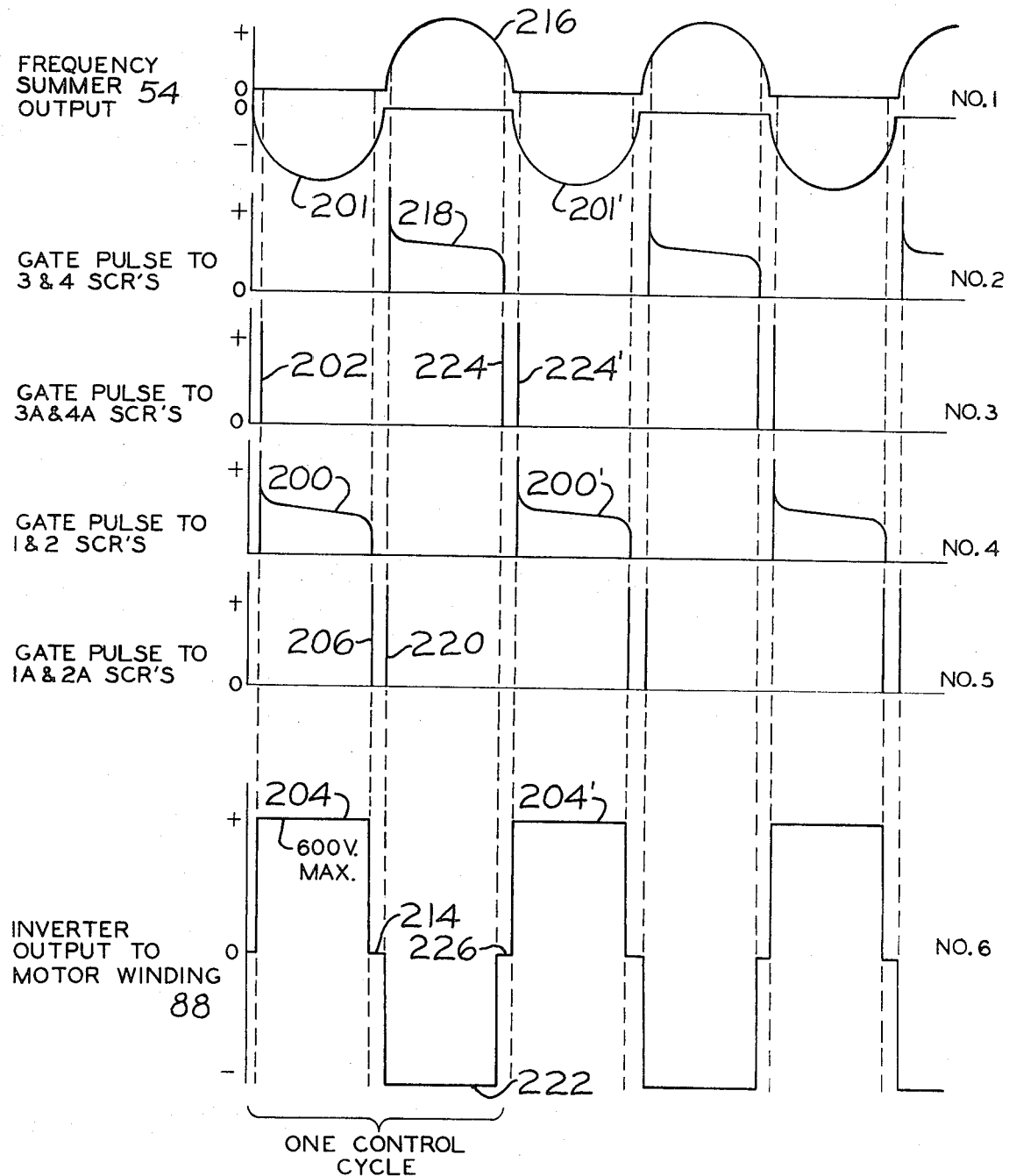

CONTROL SYSTEM FOR INERTIA WELDING MACHINES

This invention relates to a high performance, electric, variable speed drive system using an AC induction motor as the drive. The present invention embodies a variable frequency, DC link, control system. The system permits the use of an induction drive motor which is highly efficient, light in weight per horse power, and capable of operating over a wide speed range with torque acceleration and speed being adjustable through variation of the frequency and input voltage to the motor.

The present invention has particular application to a control system for controlling an AC induction motor as the drive for a high speed inertial friction welding machine.

High rotational speeds can be required to friction weld small diameter parts. Small diameter parts have small outside circumferences. Thus, to obtain the surface velocities needed to friction weld the parts, the parts must be rotated to high speeds. The high rotational speeds can be obtained by using a speed increaser between the motor and the spindle, but such speed increasers add to the machine cost and can make it difficult to obtain the proper torques and inertial forces. It is preferable to obtain the rotational speed directly from the motor, and an AC motor is preferred (for light weight and other reasons) over a DC motor.

Since The rotational speed of an AC motor is dependent on the frequency of the current supplied to the motor, the 60-cycle utility power must be changed to much higher frequency to produce high rotational speeds. A preferred way to obtain high frequencies is to rectify the 60-cycle utility power and to then use inverters to produce the frequencies required. The use of inverters eliminates rotating equipment that would be required if cyclo-converters were used to produce the high frequencies.

High rotational speeds of an inverter powered AC induction motor require precise timing for the firing sequence of inverter circuitry connected to the motor coils.

It is an important object of the present invention to achieve this precise timing.

Another object is to produce a fabricated waveform of variable voltage and frequency by means of an inverter, DC voltage control and gating unit, which will power an induction motor for operation at essentially constant torque over a wide speed range.

It is a related object to provide multiple output wave shaping circuitry which will operate in response to a reference frequency to gate inverter silicon controlled rectifiers to operate the motor at speeds dictated by the reference frequency.

The inertial welding machine with which the present invention is concerned includes a drive motor for rotating a workpiece at a high speed, a tailstock assembly for holding a stationary workpiece, a hydraulic ram for pressing the workpieces together, a hydraulic control system and an electrical control system for automatically controlling the welding operation.

The electrical control system starts and accelerates the drive motor to a preselected speed, senses the drive motor speed, automatically shuts-off power to the drive motor when the preselected speed is reached and signals a hydraulic control system to initiate and to terminate the welding sequence.

The electrical control for accelerating the drive motor includes a frequency summing control circuit, a DC link voltage control, a direction and speed transducer, an RMS motor for determining the slip frequency, wave-shaping and gate control units and silicon controlled rectifier inverters.

The speed of the motor is sensed both by a speed transducer and by a magnetic pickup device.

The transducer sends a speed signal to the input of the frequency summing control circuit and DC link voltage control. The transducer is a brushless synchro which is excited by a carrier frequency and which produces a three phase frequency modulated envelope of voltage proportional to the instantaneous angular position of the synchro rotor and frequency proportional to rotor RPM. Thus, the speed (and the instantaneous angular position) of the rotor is monitored at all times. The speed signal from the transducer is combined with a slip signal and the resultant demodulated to provide a sine wave signal for continuous regulation of the drive motor speed during acceleration.

The magnetic pickup transmits speed signals to the electrical control circuit to sequence certain operations at certain preset speeds. The magnetic pickup speed signal shuts-off power to the drive motor when the drive motor reaches a preselected speed. The speed signal also activates the hydraulic ram at a preselected speed and disengages the hydraulic ram and the tailstock assembly when the drive motor stops.

Variable power for the drive motor is obtained from an AC source which is rectified and filtered and applied in parallel to the silicon controlled rectifier inverters.

The outputs of the inverters are connected to the three separate windings of a three-phase AC induction motor.

Control is achieved by a DC link variable voltage control responsive to motor speed and a frequency summing and control circuit having inputs of a carrier frequency, drive motor speed and slip frequency. This control circuit is used to control three wave-shaping and gate control units which are in turn used to control the three inverters. The summer circuit always keeps the inverter frequency at optimum slip for the best torque per ampere. It does this by adding the desired slip RPM to the actual motor speed. For example, if a constant slip of 5 RPM above motor speed is desired the slip control is set for 5 RPM. As the motor speed increases, the inverter frequency will always be above the motor frequency by the desired amount, and the amperes required for a given torque will be approximately the same regardless of motor speed; even with the motor stopped. Therefore, excessive motor starting-current surges and motor heating are avoided. The frequency summing control circuit, slip control and speed transducer also produce a highly accurate control signal for timing the output pulses from the wave-shaping and gate control units to properly sequence the firing order of the silicon controlled rectifiers in the inverters.

The speed transducer and frequency summing and control circuit have a three-phase output.

Three sets of gating and inverter circuitry are connected to the three-phases of the output and are displaced by 120° as required for proper operation of the three-phase induction motor.

The three motor windings and the three inverters are isolated from each other to prevent interphase shorts.

Programmable unijunction transistors at the output of the gate control circuits for each inverter silicon controlled rectifier, along with a Zener-diode and a resistance-capacitor combination across a driver transformer secondary, provide a convenient means for establishing the amplitude and pulse width of the firing signal for each silicon controlled rectifier of the inverter.

The inverter includes both main silicon controlled rectifiers and commutation silicon controlled rectifiers.

An interconnection between the firing control circuits for the main silicon controlled rectifiers and those for the commutating silicon controlled rectifiers assures that there is no output from the firing controls for the commutating silicon controlled rectifiers when the related main silicon controlled rectifiers are on. This interconnection method also activates the firing circuits for the commutating silicon controlled rectifiers related to the non-conductive main silicon controlled rectifiers to cause the commutating silicon controlled rectifiers to conduct and to charge a pair of capacitors for forced commutation at the proper time as the reference signal goes to zero.

The interconnection makes use of the intrinsic voltage for firing the pulse circuits for the main silicon controlled rectifiers in a manner such that the commutating silicon controlled rectifiers are fired to provide two closely spaced signal spikes at each cross-over point of the reference sine wave.

The first spike permits discharge of the inverter capacitors to turn-off the related main silicon controlled rectifiers, and the second spike refires the same commutating silicon controlled rectifiers to recharge the capacitors to provide forced commutation at the end of the next main silicon controlled rectifier firing period.

In the interval between the closely spaced signal spikes the main silicon controlled rectifiers receive no firing signal, so that an output deadband exists to permit time for commutation. As an example, at the end of the firing period for one set of main silicon controlled rectifiers the related commutating silicon controlled rectifiers are fired to permit the charged capacitors to discharge and back-bias that set of main silicon controlled rectifiers to shut them off as the positive alternation of the reference signal decreases to near zero. As the reference signal swings negative to a certain value, the related commutating silicon controlled rectifiers refire along with another set of main silicon controlled rectifiers to recharge the capacitors to a potential proper to shut-off the other set of main silicon controlled rectifiers at the end of the negative alternation of the reference signal. During the period between the time the positive reference frequency alternation decreases to some value, for example 0.5 volts, and the time the negative reference frequency alternation reaches a negative 0.5 volts, there is no signal from the gating controls to fire any main silicon controlled rectifiers; and the deadband exists.

A control system incorporating the features noted above and effective to function in the manner described constitutes further, specific objects of the present invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

In the drawings:

FIG. 1 is a side elevation view illustrating one embodiment of an inertial friction welding machine controlled in accordance with the present invention;

FIG. 2 is a block diagram of the electrical control system of the present invention;

FIGS. 3 and 3A are block and schematic diagrams illustrating the electrical control system of FIG. 2;

FIG. 3 schematically illustrates the detailed circuitry of the wave-shaping and gate control units and FIG. 3A schematically illustrates the silicon controlled rectifier inverters; and FIG. 4 is a timing diagram which illustrates the operation of the circuits shown in FIGS. 3 and 3A.

DESCRIPTION OF THE PREFERRED EMBODIMENT

A typical inertial friction welding machine that may be controlled by the electrical control system of the present invention is indicated generally by the reference numeral 10 in FIG. 1.

The welding machine 10 includes a frame 12, an hydraulic control system 14 and an electrical control system 16.

The electrical control system 16 is the primary subject matter of the present invention and will be described in detail below.

A heat exchanger unit 18 is located at one side of the frame to provide oil cooling for various parts of the machine. The top of the frame 12 has a bed plate 20 for supporting various components of the welding machine.

A pair of spaced guide rods 22 are supported on the bed plate 20 by mounting brackets 24. A hollow shaft, electrical induction drive motor shown generally at 26 is supported upon the guide rods 22 by a gusset and stand assembly 28. The assembly 28 is secured at its lower end to the bed plate 20. A hollow rotor shaft of drive motor 26 serves as a center drive spindle for rotating one or more workpieces (not shown) to be welded.

Two movable tailstock assemblies shown generally at 30 and 32 are slidably supported upon the guide rods 22 on each side of drive motor 26.

A pair of double-acting hydraulic rams 34 are rigidly mounted to the left mounting bracket 24 with their rod ends extending through the support for attachment to tailstock assembly 30. A similar pair of double-acting hydraulic rams 36 are provided for movement of the tailstock assembly 32. While two rams are associated with each tailstock assembly, a single ram could be used.

Each of the hydraulic rams 34 and 36 has a fluid pressure port 38 for the admission and emission of pressure fluid from the hydraulic controls to the head ends of the rams. A similar fluid pressure port 40 is located at the rod ends of each of the rams.

The center drive motor 26 is secured to the guide rods 22 by means of cantilever clamps 42. During a friction welding operation the tailstock assemblies 30 and 32 are simultaneously actuated by the hydraulic rams 34 and 36 to engage workpieces (not shown) held in the tailstock assemblies 30 and 32 with the rapidly rotating workpieces (not shown) held in the drive motor 26.

The rotor shaft of drive motor 26 has a hollow bore. Since the bore through the rotor shaft is coaxial with the opening in chucks 44 and 46, one long workpiece can be passed through the rotor and clamped by both chucks or each of two shorter workpieces can be held in the individual chucks.

The rotor shaft has flanges 48 at either end. The flange elements 48 have drilled holes for attaching the chucking devices 44 and 46, and also one or more flywheels such as 50 which may be required to provide the proper amount of stored energy.

The drive motor 26 is preferably a Class K induction motor which is a low slip device. The Class K motor is characterized by low torques at speeds that are a low percentage of synchronous speed but develops maximum torque at about 5 cycles of slip from synchronous speed regardless of the frequency applied to the motor. Maximum motor efficiency (electrical) is at about one cycle slip. These characteristics used in a variable frequency system allow the advantage of a highly efficient system over a wide speed range.

A drive motor which has been found to be particularly suitable for use with the present invention is described in co-pending U.S. Pat. Application Ser. No. 797,736, entitled "Induction Motor," filed Feb. 10, 1969 by Jimmie J. Cathey and assigned to the same assignee as the present application.

This motor, in combination with the control system of the present invention, permits rapid sequencing of the welding operation, efficient operation, reduced weight per unit horsepower output of the motor and the capability of developing a large motor torque over a wide speed range. Other desirable features of drive motor 26 are described below in relation to the electrical control system of FIG. 2.

The hydraulic control system 14 of FIG. 1 consists of a fluid source, pressure pump and other components to permit proper operation of tailstock assemblies 30 and 32 and hydraulic rams 34 and 36.

The electrical control system 16 comprises circuitry to start and to accelerate the drive motor 26 to a preselected speed. The control system senses the motor speed, automatically shuts-off power to the motor when the preselected speed is reached and signals the hydraulic control system 14 to initiate and to terminate the welding sequence.

At the beginning of a welding operation, either a single workpiece may be fed through the hollow shaft of drive motor 26 and clamped in place by closing chucks 44 and 46 or two separate workpieces may be clamped in the chucks 44 and 46. Separate workpieces are then placed in each of the tailstock assemblies 30 and 32 and the hydraulic controls 14 are actuated to cause the tailstock assemblies to securely lock the workpieces in position.

The electrical controls are then set and actuated to cause the drive motor 26 to accelerate to a speed proper for welding of the materials being joined. When the desired speed is reached, a feed-back speed signal (from a magnetic pick-up 72) causes the power to the motor to be discontinued. Simultaneously a signal is sent to the hydraulic control system to supply pressure fluid to hydraulic rams 34 and 36. This causes the tailstock assemblies 30 and 32 to be urged toward drive motor 26 until the workpieces held in the tailstock assemblies come into contact with the rotating workpiece or workpieces held in the spindle of drive motor 26.

During the welding operation the drive motor 26, which is fixed in place, is in a balanced condition between the tailstock assemblies 30 and 32 since the thrust of hydraulic rams 34 cancels out the thrust of hydraulic rams 36. This balanced condition minimizes the load on the bearings of drive motor 26. Upon completion of the weld, the controls function to operate the tailstock assemblies 30 and 32 and chucks 44 and 46 to unclamp the workpieces so that the welded workpieces can be removed.

FIG. 2 shows a block diagram of the electrical control system 16 of the present invention. The electrical control starts and accelerates the drive motor 26 to a preselected speed. The control also senses the drive motor speed, controls motor voltage and frequency, automatically shuts-off power to the drive motor when the preselected speed is reached and provides signals to the hydraulic control system 14 to initiate and to terminate the welding sequence.

During the starting and acceleration of the drive motor 26 the power to the motor from the power source 52 is controlled by a variable DC link voltage control 100, a frequency summing control circuit 54, a direction and speed transducer 56, an RMS motor 58, and wave-shaping and gate control units 60, 62 and 64. The power is conducted to the motor through silicon controlled rectifier inverters 66, 68 and 70 under the direct control of the gate units 60, 62 and 64.

The speed of the drive motor 26 is sensed both by a transducer 56 and by a magnetic pickup 72.

The transducer 56 transmits signals over the lines 74 to the input of the frequency summing control circuit 54 and over lines 74a to voltage control 100 to provide drive motor speed information for purposes of starting and accelerating the drive motor to the preselected speed.

The magnetic pickup 72 transmits a speed signal over a line 76 to the input of a welder control circuit 78. The speed signal from the pickup 72 is matched against three reference voltages in the control 78. When the motor reaches the maximum desired speed, a signal is produced on the line 80 which provides a shut-off signal to the gate units 60, 62 and 64 to stop conduction in the inverters 66, 68 and 70 and to remove power from the motor 26. The same signal is also present on the line 82 leading to an actuator. In this case that signal causes the hydraulic rams 34 and 36 to provide initial thrust to the interface area of the parts to be joined in the inertial welder. As deceleration occurs during the weld cycle, a second signal is produced on the line 86 which causes a second stage thrust to be applied. Deceleration to zero speed causes a signal to be present on the line 84 at the termination of the weld cycle and causes the rams to be retracted.

As shown in FIG. 1 the magnetic pickup 72 is mounted near to the flywheel 50. The flywheel has a series of shallow holes at its inner face to create an interruption in the magnetic field and to cause the magnetic pickup to transmit a speed signal indicating the speed of the flywheel and the drive motor 26. Depending on convenience and ease of installation, the magnetic pickup could be located adjacent to any at the rotating parts, such as the chucks 44 and 46, the flange elements 48 or a toothed gear mounted on the motor shaft between the motor bearing housing and the flange 48.

The magnetic pickup 72 and the welder control circuit 78 make up a speed indicator in which a signal is sensed by the magnetic pickup and is then passed in series through a squaring amplifier, a differentiator, a monostable mulltivibrator, a filter integrator and in parallel through a plurality of comparator amplifiers. In each of the comparator amplifiers, the signal is compared to a reference voltage and a relay is operated by the signal as it reaches the value of the reference voltage. A detailed description of the magnetic pickup 72 and the welder control circuit 78 combination is set forth in co-pending U.S. Pat. Application entitled "Inertia Welder Speed Control Device" Ser. No. 791,440 filed Jan. 15, 1969, now abandoned by Coleman et al and assigned to the assignee of the present application.

Although the drive motor 26 may be of any type consistent with the control system of the present invention, it is preferably an oil-cooled, three-phase wye connected motor with the three-phase windings 88, 90 and 92 separated.

A wye configuration is desirable because it eliminates undesirable third, sixth and ninth harmonics.

Separating the three-phase windings is beneficial in eliminating the possibility of interphase shorts which could damage the silicon controlled rectifiers of the inverter circuits 66, 68 and 70 if the control system malfunctioned to cause imporper sequencing of the firing order of the silicon controlled rectifiers. As an example, if the silicon controlled rectifiers in the inverter for the phase 3 winding 92 were conductive, and the silicon controlled rectifiers in the inverter for the phase 2 winding 90 did not turn off properly, a short circuit to the power source could be completed through the motor windings if the motor windings were connected to a common point. This could damage any or all of the silicon controlled rectifiers in the circuits affected.

A particular type of direction and speed transducer 56 that has been found effective is shown and described in U.S. Pat. No. 3,445,697, entitled "Brushless Direction and Speed Sensing Transducer," issued May 20, 1969 to Philip J. Costa and assigned to the same assignee as the present application.

This transducer preferably uses a rotary transformer that is shown and described in U.S. Pat. No. 3,441,887, entitled "High Frequency Rotary Inductive Coupling," issued Apr. 29, 1969 to Philip J. Costa and assigned to the same assignee as the present application.

The speed transducer 56 is supplied a carrier frequency by a carrier frequency oscillator, not shown, and provides an amplitude modulated three-phase signal. The envelope of the signal produced by the transducer 56 is indicative of the actual speed of motor 26 and is applied as one of the inputs to the frequency summing control circuit 54 through lines 74. The frequency summing control circuit 54 is also supplied a carrier frequency by the carrier frequency oscillator (not shown).

The RMS motor 58 provides the other input to control circuit 54 through a line 94.

The power for the motor 26 is supplied by a power source 52 including a 3-phase utility source 96, a full wave bridge rectifier 98, a voltage control device 100 and a filter 102.

The voltage level at the output of the rectifier 98 is controlled by a conventional voltage control device 100 in response to a speed signal from transducer 56.

The output of rectifier 98 is applied to the input of the filter 102.

The output of the filter 102 is applied in parallel to the silicon controlled rectifier inverters 66, 68 and 70.

The output of the inverter 66 (phase 1) is connected to a motor winding 88 (phase 1).

The output of the inverter 68 (phase 2) is connected to a motor winding 90 (phase 2).

And the output of the inverter 70 is connected to a motor winding 92 (phase 3).

The particular configuration of the inverters 66, 68 and 70 will be described below in reference to FIG. 3.

The output of the wave-shaping and gate control unit 60 (phase 1) is applied to the input of the inverter 66 (phase 1).

The output of the wave-shaping and gate control unit 62 (phase 2) is applied to the input of the inverter 68 (phase 2).

The output of the wave-shaping and gate control unit 64 (phase 3) is applied to the input of the inverter 70 (phase 3).

The control units 60, 62 and 64 control the firing of the inverters 66, 68 and 70 in a manner as hereinafter described in reference to FIGS. 3 and 3A.

The control units 60, 62 and 64 are in turn controlled by a frequency summing and control circuit 54. The output lines 104, 106 and 108 of the circuit 54 are connected to the inputs of the control units 60, 62 and 64. A detailed description of the frequency summing and control circuit 54 is set forth in copending U.S. Pat. Application Ser. No. 711,354 entitled "Frequency Summing Control Circuit," filed Mar. 7, 1968 by Costa et al. and assigned to the same assignee as the present application.

The control circuit 54 combines a carrier frequency speed signal (which may be from the same carrier frequency oscillator used to supply the speed transducer 56) with a controlled slip signal from the RMS motor 58. The circuit 54 provides a three-phase, demodulated output frequency that is the sum or difference of the inputs from the speed transducer 56 and the RMS motor 58. These three components — the frequency summing control circuit 54, the speed transducer 56 and the slip control motor 58 — are developed components and form an outstanding basis for timing the output pulses from the wave shaping and gate control circuits 60, 62 and 64 to properly sequence the firing order of the silicon controlled rectifiers in the inverters 66, 68 and 70 at all rotational speeds of the motor.

Logic and impedence matching is used at the output of the control circuit 54 to provide a usable reference or control signal on both the positive and negative alternations of each of the three phases of output.

Operation of the control system 16 of FIG. 2 is as follows.

If the system is energized with the drive motor 26 at stand still, and there is no slip frequency input over line 94, a DC voltage determined by the adjustable setting of voltage control 100 will be applied to the inverters 66, 68, 70, but no further action occurs since there is a zero signal on line 94 as well as lines 74 from the speed transducer 56, and hence no output from the control circuit 54 over lines 104, 106, and 108 to the inputs of the control units 60, 62 and 64.

However, when a slip frequency signal appears on line 94 the system will start to function.

This slip frequency signal from the RMS motor 58 drives the rotor of a differential transformer within the control circuit 54 at a specific speed as set by the operator. This slip frequency signal is constant and is set at from about 1 to about 6 cycles per second, dependent upon how rapidly it is desirable for motor 26 to accelerate.

The output from the control circuit 54 sequences the firing of the silicon controlled rectifiers of the inverters 66, 68 and 70 through the control units 60, 62 and 64 and will always remain above the frequency of the motor 26 by the amount of the slip frequency on the line 94, and the motor 26 will have a constant accelerating torque limited only by the maximum frequency capability of the inverters. An exception to this is if the voltage control 100 were to be adjusted to provide less than full voltage output from the rectifier 98 and the motor torque could be low for the load applied. In such a case the drive motor speed would stabilize at a point below the maximum speed as established by the reduced motor torque. This point is reached when the available motor torque is equal to the sum of the motor losses and the applied load.

As the motor 26 accelerates, its speed is monitored by the magnetic pickup 72. The output signal of the pickup 72 is fed to the welder control circuit 78 where it is matched against three predetermined reference voltages.

When the motor reaches the maximum desired speed, a signal is produced on the line 80 which provides a shut-off signal to the gate control units 60, 62 and 64 to stop conduction in the inverters 66, 68 and 70. This cuts off power to the motor 26. The same signal is also present on the line 82 leading to the hydraulic control system 14 of FIG. 1 for actuating the hydraulic rams 34 and 36 to press the parts to be welded together at their interface.

As deceleration occurs during the weld cycle, a second signal is produced on the line 86 which causes the second stage thrust to be applied. Deceleration to zero speed causes a signal to be present on the line 84 at the termination of the weld cycle and causes the thrust cylinders to be retracted.

As explained in detail in the above noted U.S. Pat. Application Ser. NO. 711,354, braking or deceleration of the motor 26 can be effected once it is running by reversal of the signal on the line 94 to the control unit 54 to provide negative slip where the control frequency from the control unit 54 is always less than the motor frequency by a set amount. This mode of operation could permit braking where extremely accurate speed limiting is required for specific welding application. In a normal inertial weld cycle it is usually desirable to accelerate the motor rapidly to an initial welding speed and then to cut the power completely to permit the weld to be made by all of the energy stored in the flywheel.

FIGS. 3 and 3A show the motor control circuit partially in block form and partially in schematic form. The circuitry of the wave-shaping and gate control 60 for phase 1 is shown schematically (in FIG. 3) as is the phase 1 inverter circuit 66 (in FIG. 3A). The circuitry for controlling only the input to the coil 88 of the motor 26 is shown.

Identical circuits are required for the coils 90 and 92 which operate in response to the phase 2 and phase 3 outputs from the summing circuit 54.

The three phases of the output from the summer 54 are conventionally displaced by 120 electrical degrees, thus the input to the three phases of the motor 26 will be a fabricated wave form of conventional 3-phase characteristics with 120 degree displacement between phases.

As shown in FIG. 3A, the inverter 66 consists of four main silicon controlled rectifiers 1, 2, 3 and 4, which control power to the phase 1 winding 88. These silicon controlled rectifiers fire alternately 1-2 and 3-4 to provide the alternating characteristic to the power for the winding 88, and they are force-commutated by related commutating silicon controlled rectifiers 1A, 2A, 3A, and 4A, in a manner to be later described.

The firing sequence for all eight silicon controlled rectifiers in the inverter is controlled by the wave-shaping and gate control unit 60 in response to the sinusoidal output signal from the phase 1 output of the frequency summing control circuit 54.

It will be noted that the control signals for the control unit 60 are supplied over lines 104 from the control circuit 54 output.

As shown in FIG. 3 the control unit 60 has four gate firing circuits 110, 112, 114 and 116; and each gate firing circuit has two output sections. The positive lead of each gate firing circuit is connected to the gate of a silicon controlled rectifier, and the negative lead is connected to the cathode of the silicon controlled rectifier. Various letter codes A through R are applied to the output leads of the output sections of the gate firing circuits 110, 112, 114 and 116 in FIG. 3. The various leads A through R are connected to the silicon controlled rectifiers 1 through 4 and 1A through 4A as indicated by the corresponding letter symbols A through R in FIG. 3A. For example, the output section N through P of the gate firing circuit 116 has the positive N output connected by the line 118 to the gate of the silicon controlled rectifier 2A and the negative P output connected by the line 120 to the cathode of the silicon controlled rectifier 2A. By way of further example, the output section Q–R of the gate firing circuit 116 has the positive Q output connected by the line 122 to the gate of the silicon controlled rectifier 1A and the negative R output connected by the line 124 to the cathode of silicon controlled rectifier 1A.

Each phase of the output of the summer control circuit 54 is opened by a relay or a switch such as a switch 126 in the gating and wave-shaping control unit 60 in response to a maximum speed signal on the line 80 (of FIG. 2) from the welder control circuit 78. Thus, as the drive motor 26 reaches the desired speed the input to the gate control unit 60 is opened. The unit 60 can then have no output to cause the silicon controlled rectifiers of the inverters to fire, and power is removed from the motor 26.

In the control unit 60 a pair of identical gate firing circuits 110 and 114 function to provide gate firing pulses to the main silicon controlled rectifiers of inverter 66.

The circuit 110 is powered from a positive power supply (not shown) and provides firing pulses to the silicon controlled rectifiers 3 and 4 during the positive alternation of the output from control circuit 54.

The circuit 114 is powered from a negative power supply (not shown) and, through reversal of the driver transformer secondaries, provides the necessary positive pulses to the appropriate gates of the silicon controlled rectifiers 1 and 2 causing conduction during the negative alternation of the output of control circuit 54.

As the output of the control circuit 54 goes positive, the transistor 128 is forward biased over the line 130 to cause the transistor 128 to conduct and to cause the switching transistor 132 to conduct and to ground the power supply through the driver transformer primary and the collector-emitter circuit of the transistor 132. This results in a pulse in both driver transformer secondaries which charges a capacitor 134 and which is regulated by a zener diode 136.

A programmable unijunction transistor 138 provides the firing pulse to the related silicon controlled rectifier when the charge on capacitor 134 reaches the voltage rating of the zener diode 136.

The initial height of the pulse is established at the instant the transistor 138 fires, at which time the combination of the capacitor 140 and the resistor 142 effectively reduces the impedance of the circuit during the charging period of the capacitor 140.

The pulse width is determined by the time required for the capacitor 134 to discharge.

The zener rating must be high enough to result in an initial spike of sufficient amplitude to drive the gate of the related silicon controlled rectifier hard to insure that it conducts. The silicon controlled rectifier, like any controlled rectifier, will continue to conduct, once gated, until it is forced out of conduction either by opening its anode circuit or by providing a cathode potential that is above the anode potential.

Thus, each time the phase 1 output of the control circuit 54 on the line 130 goes positive, the NPN transistors 128 and 132 will conduct. This results in pulses from programmable unijunction transistors 138 and 138' that will cause the silicon controlled rectifiers 3 and 4 to fire and to conduct through the motor winding 88 in one direction.

Similarly, each time the output of the control circuit 54 goes negative the PNP transistors 144 and 146 in the gate firing circuit 114 will conduct in response to a signal on the line 148. This will cause the programmable unijunction transistors 150 and 150' to provide firing pulses to the silicon controlled rectifiers 1 and 2 which, when conductive, supply power through motor winding 88 (phase 1) in a reverse direction.

Thus, the effect of an alternating current across the motor winding is provided by controlled alternate conduction of the silicon controlled rectifiers 3-4 and 1-2 in the inverter 66.

Proper functioning of the inverter 66 is based on alternate conduction through the silicon controlled rectifiers 3-4 and 1-2. Such conduction must be precisely sequenced to prevent, for example, the silicon controlled rectifiers 1 and 4 from being conductive at the same instant. This would result in a direct short through the inverter, bypassing the motor winding and causing damage to the shorted silicon controlled rectifiers. This means that the firing controls must function (1) to prevent the silicon controlled rectifiers 1 and 2 from conducting during the time the silicon controlled rectifiers 3 and 4 are conductive and (2) to shut off the silicon controlled rectifiers 3 and 4 before the silicon controlled rectifiers 1 and 2 start to conduct.

This control is provided by the silicon controlled rectifiers 1A through 4A, associated with the silicon controlled rectifiers 1 through 4, which receive pulses from the gate firing circuits 112 and 116 in the firing control unit 60.

The gate firing circuits 112 and 116 are push-pull type circuits and receive inputs from both of the gate firing circuits 110 and 114. The collector voltage from the transistor 132 in the gate firing circuit 110 is fed to both of the gate firing circuits 112 and 116 over the line 152.

When the signal from the control circuit 54 on line 130 goes positive, the gate firing circuit 110 functions to provide a gating signal to the silicon controlled rectifiers 3 and 4 from the transistors 138' and 138. This cause the collector voltage on the transistor 132 to go negative, placing a negative signal on the line 152. This signal is differentiated by the capacitor 154 to provide a sharp negative spike at the base of the transistor 156 to drive the transistors 156 and 158 into conduction. Current then flows from ground to negative through the driver transformer circuits of the gate firing circuit 116 causing the programmable unijunction transistors 160 and 160' to turn on the silicon controlled rectifiers 1A and 2A which charge a pair of capacitors 206 and 208 (FIG. 3A) for a function hereinafter described.

The negative signal on line 152 remains to prevent the transistor 164 from conducting until near the end of the positive alternation of the output from the summer control circuit 54 over the line 130 when the transistors 128 and 132 swing toward their non-conductive state.

When the collector voltage of the transistor 132 rises to the original supply voltage, the signal on the line 152 goes positive and, being applied to the base of the transistor 164, causes conduction through the transistors 164 and 166 to ground pulsing the driver transformers in the gate firing circuit 112. This causes the programmable unijunction transistors 168 and 168' to put out a spike of short duration to gate the silicon controlled rectifiers 3A and 4A and to cause a shut-off signal for the silicon controlled rectifiers 3 and 4.

As the signal from the control circuit 54 goes negative, the signal on the line 148 activates the circuit 114 causing the transistors 150 and 150' to gate the silicon controlled rectifiers 1 and 2 on to reverse current flow through the motor winding 88. As the collector potential of the transistor 146 swings positive, a positive signal on line 170 drives the transistors 172 and 174 into conduction causing the transistors 168 and 168' to put out a signal spike to gate the silicon controlled rectifiers 3A and 4A on simultaneously with the beginning of the firing period for the silicon controlled rectifiers 1 and 2.

At the end of the negative alternation on the line 148 the potential on the line 170 goes negative turning on the transistors 176 and 178 and causing the transistors 160 and 160' to put out a signal spike to gate the silicon controlled rectifiers 1A and 2A and to turn off the silicon controlled rectifiers 1 and 2.

From the above discussion it will be seen that the firing pulses of long duration from the transistors 138 and 138' keep the silicon controlled rectifiers 3 and 4 in conduction during the major part of the positive alternation of each signal cycle from the control circuit 54.

Similarly, the transistors 150 and 150' put out long duration pulses that timewise correspond to the major portion of each negative alternation from the control circuit 54 to keep the silicon controlled rectifiers 1 and 2 in conduction.

Interaction of the gate firing circuits 110 and 114 with the gate firing circuits 112 and 116 causes the circuits 112 and 116 to put out two closely spaced signal spikes of short duration at each cross-over point on the sine wave output from the control circuit 54. The arrangement is such that the gate firing circuit 112 puts out its two spikes as the output from the control circuit 54 goes from positive to negative while the gate firing circuit 116 produces its two spikes as the output of the control circuit 54 goes from negative to positive. The first spike in each case shuts-off the related silicon controlled rectifiers by letting a pair of capacitors discharge while the second spike causes charges to be stored in the capacitors that are used for a later shut-off control function.

A better understanding of the circuit timing and operation of the inverter 66 will be realized from the following description when considered with the schematic diagrams of FIGS. 3 and 3A and the timing diagram of FIG. 4.

FIG. 3A shows a schematic diagram of the inverter 66, which is one of the three phases of the complete inverter. Rectified and filtered direct current is supplied to the inverter over the line 180 (having a positive voltage) and over the line 182 (having a negative voltage) from the bridge rectifier and filter circuits 98 and 102. The silicon controlled rectifiers 1 through 4 are the main motor power silicon controlled rectifiers and are connected to conduct from the positive line 180 through the motor winding 88 to the negative line 182.

When the sine wave output from control circuit 54 is positive, the silicon controlled rectifiers 3 and 4 conduct to furnish current to the winding 88 in one direction.

When the silicon controlled rectifiers 1 and 2 are conductive during the negative portion of the output of the control circuit 54, the current flows in the opposite direction through the winding 88.

Assuming that at the instant the electrical control system 16 (FIG. 1) is turned on the summing control circuit 54 initially puts out a negative alternation, the set of traces shown in FIG. 4 would exist starting from zero time. The sequence of events as related to the outputs from control unit 60 would be as follows:

1. Silicon controlled rectifiers 1 and 2 on (transistors 150 and 150' conduct). Silicon controlled rectifiers 3A and 4A on (transistors 168 and 168' conduct).
2. Silicon controlled rectifiers 1A and 2A on (transistors 160 and 160' conduct).
3. Silicon controlled rectifiers 3 and 4 on (transistors 138 and 138' conduct). Silicon controlled rectifiers 1A and 2A on (transistors 160 and 160' conduct).
4. Silicon controlled rectifiers 3A and 4A on (transistors 168 and 168' conduct).

Referring to the timing diagrams of FIG. 4, as the signal 201 (trace No. 1) from the summer control circuit 54 goes negative, the gate firing circuit 114 becomes active and sends the gating signal 200 (trace No. 4) to turn on the silicon controlled rectifiers 1 and 2. This signal is initially a sharp rising spike of an approximate amplitude of 24 volts of fire the gates hard and is established by the rating of the zener diodes in the circuit 114. The signal then decays with the pulse width being established by the discharge time of the capacitor across the transformer secondaries in the circuit 114, but remains sufficiently high to insure that the silicon controlled rectifiers remain on as desired. Simultaneously, as the above-described signal is initiated, the gate firing circuit 112 becomes active to put out a pulse 202 (trace No. 3) which fires the silicon controlled rectifiers 3A and 4A. This signal is also a spike of approximately 24 volts to fire the gates hard.

When the silicon controlled rectifiers 1 and 2 conduct, the power appears across the motor winding as shown at 204 (trace No. 6). The trace No. 6 is representation of the current seen by the winding 88 in the motor. The current flowing through the inverter is always positive to negative, but is caused to reverse direction as related to the motor winding by the action of the inverter circuit.

When the silicon controlled rectifier 4A is turned on by the pulse 202 (trace No. 3), the effect is to cause capacitor 206 to charge positive to negative as shown above line 207 in FIG. 3A.

Conduction of the silicon controlled rectifier 3A causes a second capacitor 208 to charge as shown below line 209.

The pulse 202 is of very short duration, but once gated the silicon controlled rectifiers 3A and 4A will remain conductive until the capacitors are charged to full line voltage. When the potential across them, anode to cathode, is equal, they are starved and will become non-conductive leaving the capacitors charged. At this time, since all the commutating silicon controlled rectifiers 1A through 4A are off, the capacitors are effectively open-circuited; so they remain charged until such time as some action takes place to tie the open end to either the positive or the negative power line.

As the negative signal 201 (trace No. 1) from the summer control circuit 54 approaches zero, the gate firing circuit 116 becomes active to provide a sharp pulse 206 (trace No. 5) and to turn on the silicon controlled rectifiers 1A and 2A. The free end of the capacitor 206 is then tied to the positive line, and the capacitor 208 is tied to the negative line. When this occurs the charges built up in the capacitors discharge in a direction to back-bias the silicon controlled rectifiers 1 and 2 by the amount of the voltage drop across the shunt diodes 210 and 212.

Discharging the capacitors when the silicon controlled rectifiers 1A and 2A are on serves to starve the silicon controlled rectifiers 1 and 2 to shut them off and further to maintain current flow to the load during the short period of commutation.

The shunt diodes bypass power back to the source to prevent excess power from going to the load.

When the silicon controlled rectifiers 1 and 2 shut-off, no power goes to the load and the pulse 204 (trace No. 6) goes to zero.

A short deadband or commutating period 214 (trace No. 6) is then allowed as the output of the summer control circuit 54 swings positive at 216 (trace No. 1) to assure decay of the firing pulse 200 (trace No. 4) before the rising voltage at 216 (trace No. 1) reaches a point to trigger the gate firing circuits 110 and to retrigger the gate firing circuit 116.

The circuit 110 puts out the pulses 218 (trace No. 2) to fire the silicon controlled rectifiers 3 and 4, and the circuit 116 puts out a spike 220 (trace No. 5) to fire the silicon controlled rectifiers 1A and 2A which this time charge capacitors 206 and 208 in the opposite direction to that previously described.

The conduction of the silicon controlled rectifiers 3 and 4 results in a reversal of the current 222 (trace No. 6) in the motor winding.

The same action now occurs with the silicon controlled rectifiers 3 and 4 firing as was described for the firing period of the silicon controlled rectifiers 1 and 2, except the current is reversed in the motor winding.

This provides the AC effect for powering the induction motor.

At the end of the pulse 216 (trace No. 1) from the summer control circuit 54, the gate firing circuit 112 becomes active to put out a spike 224 (trace No. 3) which shuts-off the silicon controlled rectifiers 3 and 4; and a second deadband for commutation occurs at 226 (trace No. 6) before the next alternation 201' (trace No. 1) from the control circuit 54 provides the firing pulse 200' (trace No. 4) for firing the silicon controlled rectifiers 1 and 2 and the firing pulse 224' (trace No. 3) to gate the silicon controlled rectifiers 3A and 4A on. The pulse 200' (trace No. 4) and the refiring of the silicon controlled rectifiers 1 and 2 result in a pulse 204' (trace No. 6) which is reversed from the pulse 222 (trace No. 6) as seen by the motor.

It will be apparent from the above that the timing of the pulses from the control unit 60 is of particular importance. The pulses in traces No. 3 and No. 5 must be of extremely short duration to assure no over-lapping which could result in one set of silicon controlled rectifiers continuing to conduct when the other set is gated on. This would result in a direct short through the inverter and damage to costly components. This is especially true in the higher speed operating ranges where the frequency of the summer output circuit 54 would be increased, and the deadbands 214 and 226 (and time for commutation) would become shortened.

The RC networks, such as indicated by the reference numeral 230 in the inverter 66, are suppressor circuits and function with the center-tapped inductances to prevent firing the silicon controlled rectifiers due to a sudden application of the voltage in the absence of a gating signal.

The inductances in the inverter circuit in series with the capacitors 206 and 208 form LC time constants for forced commutation of the main silicon controlled rectifiers.

The above-described circuit has been found to be particularly useful for supplying power to an inertial welder; however, it would be applicable to the drive means for any machine tool driven by an induction motor. The precision output of the speed transducer and control circuit 54 at all rotational speeds form an outstanding reference for such control. Motor speeds attainable would be limited only by the precision built into control unit 60 to provide pulses of precise duration and timing and in the construction of the inverter and state of the art of components used therein. High speed operation requires not only precise pulses and wave forms from the gate control circuit, but also requires precision silicon controlled rectifiers in the inverter that can react in turning on and off in response to such precision control signals.

In the normal operation of a production inertial welder, it is only necessary to accelerate the flywheel mass to the desired initial welding speed in the shortest possible time. After this speed is obtained, the drive from the motor to the flywheel is discontinued. The flywheel then drives the part as the weld process decelerates the flywheel. Complex arrangements for programming and the like are therefore not normally required for inertial welding.

The same circuit disclosed in this application could however be made applicable to a programmed friction welder where the motor provides welding torque at all times. The addition of programming controls such as shown in U.S. Pat. Application Ser. No. 715,715, entitled "Speed-Programmed Friction Welder Control" filed Mar. 25, 1968 by Robert G. Miller and assigned to the same assignee as the present application may be combined with the present circuit to program the slip frequency input to the frequency summer control circuit 54 and to vary the drive motor speed according to a prescribed schedule.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A friction welder of the kind in which parts to be welded are pressed together in frictional rubbing contact and comprising, a rotatable spindle for rotating one of the parts to be welded, a tailstock for holding another part to be welded, loading means for engaging the parts under an axial load at their interface, an alternating current induction motor connected to rotate the spindle over a range of speeds, and power means for shaping a variable frequency fabricated wave of alternating current from direct current and connected to supply the fabricated wave to the motor.

2. A friction welder as defined in claim 1 wherein the power means include control apparatus effective to control the speed of the motor by changing the frequency of alternation of the fabricated wave.

3. A friction welder of the kind in which parts to be welded are pressed together in frictional rubbing contact and comprising, a rotatable spindle for rotating one of the parts to be welded, an alternating current induction motor connected to rotate the spindle over a range of speeds, and power means for shaping a variable frequency fabricated wave of alternating current from direct current and connected to supply the fabricated wave to the motor, said power means including control apparatus effective to control the speed of the motor by changing the frequency of alternation of the fabricated wave and wherein the control apparatus includes a slip control effective to produce a slip signal for regulating the amount of slip in the motor.

4. A friction welder of the kind in which parts to be welded are pressed together in friction rubbing contact and comprising, a rotatable spindle for rotating one of the parts to be welded, an alternating current induction motor connected to rotate the spindle over a range of speeds, and power means for shaping a variable frequency fabricated wave of alternating current from direct current and connected to supply the fabricated wave to the motor, said power means including control apparatus effective to control the speed of the motor by changing the frequency of alternation of the fabricated wave and wherein the power means include a voltage control for regulating the voltage level of the direct current.

5. A friction welder as defined in claim 3 wherein the control apparatus includes a transducer which produces a speed signal indicative of the spindle rotational speed.

6. A friction welder as defined in claim 5 wherein the control apparatus includes a summing circuit which combines the slip signal and the speed signal to produce a highly accurate output speed control signal at all speeds of the spindle from zero to high spindle rotational speeds.

7. A friction welder as defined in claim 5 wherein the power means include an inverter having an input connected to the direct current and an output connected to the motor, said inverter including two alternately fired rectifier circuits for each phase of power output to produce the alternation in the fabricate wave form, and wherein the power means also include a gating unit connected between the summing circuit and the inverter and effective to fire said rectifier circuits in alternation at a frequency determined by the summing circuit.

8. A friction welder as defined in claim 7 wherein each rectifier circuit includes a main silicon controlled rectifier and each gating unit includes a driver transformer, a programmable unijunction transistor and a Zener and a resistance-capacitor combination connected across the secondary of the driver transformer for establishing the amplitude and pulse width of the firing signal for each main silicon controlled rectifier.

9. A friction welder as defined in claim 7 wherein the inverter includes main silicon controlled rectifiers, commutation silicon controlled rectifiers and an interconnection between the main silicon controlled rectifiers and the commutation silicon controlled rectifiers which is effective to fire the commutation silicon controlled rectifiers to cause shut off of the main silicon controlled rectifiers.

10. A friction welder as defined in claim 9 wherein the gating unit includes capacitors and gate firing circuits effective to put out two closely spaced signal spikes of short duration at each crossover point on a sine wave output from the control apparatus for shutting off the main silicon controlled rectifiers by letting the capacitors discharge and for causing charges to be stored in the capacitors for the next shut off control function.

11. A friction welder as defined in claim 10 wherein the gating unit includes means for producing a dead band at each crossover point.

* * * * *